United States Patent [19]

Adams

[11] Patent Number: 4,848,713
[45] Date of Patent: Jul. 18, 1989

[54] APPARATUS FOR HOLDING ARTICLES

[75] Inventor: William E. Adams, Portersville, Pa.

[73] Assignee: Adams, Mfg., Portersville, Pa.

[21] Appl. No.: 213,626

[22] Filed: Jun. 30, 1988

[51] Int. Cl.⁴ ............................................. F16B 47/00
[52] U.S. Cl. .................................. 248/206.2; 248/304
[58] Field of Search ............... 248/205.5, 205.6, 205.7,
248/205.8, 205.9, 206.1, 206.2, 206.3, 206.4,
206.5, 205.3, 205.4, 304, 309.3, 359 A, 362, 363;
24/16 PB, 17 AP, 270, 30.5 P, 335, 464, 481

[56] References Cited

U.S. PATENT DOCUMENTS

| 253,392 | 2/1882 | Jones | 248/205.5 |
|---|---|---|---|
| 1,518,943 | 12/1924 | Story | 248/205.5 |
| 1,877,570 | 9/1932 | Fitzgerald | 248/362 |
| 3,029,547 | 4/1962 | Ross | 248/359 A |
| 3,042,959 | 7/1962 | Strom | 248/362 |
| 3,118,200 | 1/1964 | Bell | 24/16 PB |
| 3,276,734 | 10/1966 | Goldblatt | 248/362 |

FOREIGN PATENT DOCUMENTS

| 1030452 | 6/1953 | France | 248/206.1 |
|---|---|---|---|
| 1418989 | 10/1965 | France | 24/30.5 P |
| 1479570 | 5/1967 | France | 248/205.5 |
| 340813 | 1/1931 | United Kingdom | 248/205.7 |

*Primary Examiner*—J. Franklin Foss
*Assistant Examiner*—Robert A. Olson
*Attorney, Agent, or Firm*—Buchanan Ingersoll; Lynn J. Alstadt

[57] ABSTRACT

An apparatus for holding articles is disclosed in which a suction cup of the type having a neck extending from the back of the cup is provided. A central bore and a slot depending from the central bore are provided in the neck and receive a head portion of a hook device. The hook device has a body extending from the head and is shaped to hold an article. The hook also has arm-like extensions from the hook body which curve around the outside of the neck of the cup and provide an additional securing force.

13 Claims, 1 Drawing Sheet

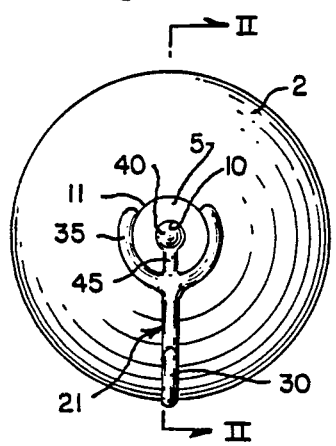
Fig. 1.
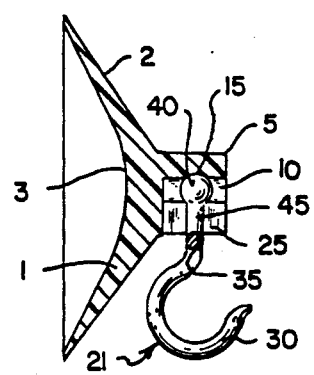
Fig. 2.
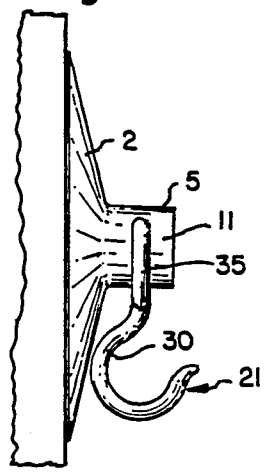
Fig. 3.
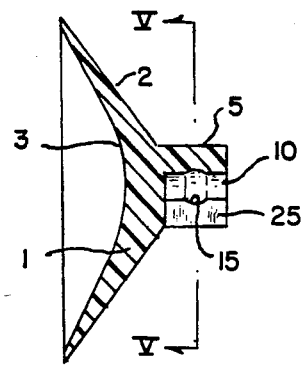
Fig. 4.
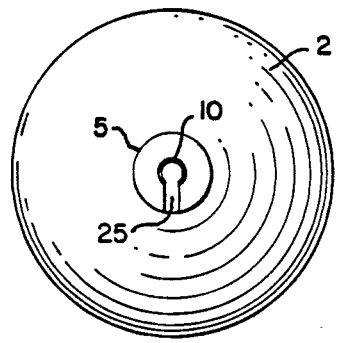
Fig. 5.
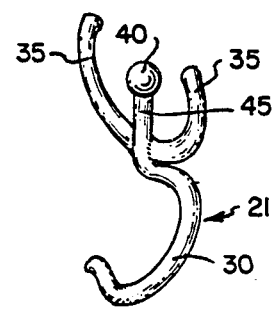
Fig. 6.
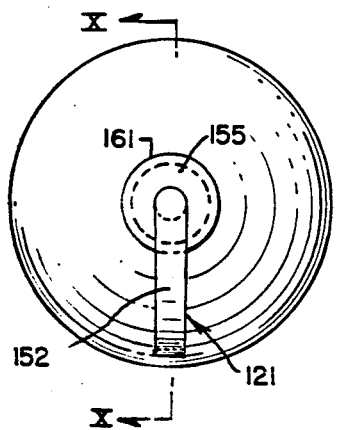
Fig. 7.
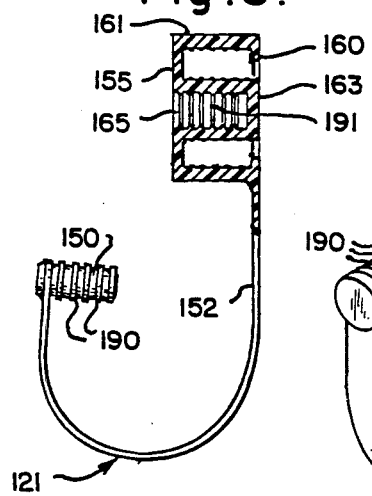
Fig. 8.
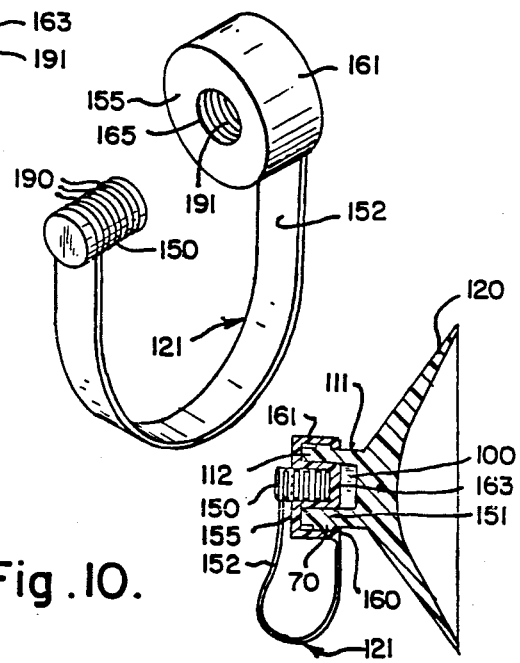
Fig. 9.
Fig. 10.

APPARATUS FOR HOLDING ARTICLES

BACKGROUND OF THE INVENTION

1. Field of the Invention

The present invention relates to a suction cup with a novel hook and method of attaching the hook to the cup.

2. Description of the Prior Art

The conventional suction cup has a cup shaped portion with a neck extending from the convex side. The prior art has used suction cups for attaching devices, decorative artwork, and other lightweight items to a wall or other surface. This is accomplished by bonding the neck of the suction cup to the article or by inserting a pin that extends through the article into the cup neck. Others have made hooks with a loop at one end to fit around the neck of the cup. Some provide ribs to prevent the loop from easily slipping off the neck.

As a matter of physics, the cup itself must be soft and resilient, to both conform to the surface and retain a vacuum between the cup and the surface. The hook, or other attachment means, must necessarily be of a stronger material such as plastic or die-cast metal, to support the weight of the item hung or otherwise attached to the cup apparatus. A need has arisen to join these two materials in a way which will support a greater hanging weight than presently available and also remain lightweight and easily manufactured.

SUMMARY OF THE INVENTION

I have provided a new type of suction cup and hook which will increase the amount of weight supportable by a suction cup, while retaining the simple and lightweight nature of the apparatus.

A generally well-known type of suction cup is provided, with one face being concave and adapted for contact with a wall or other surface, the opposite face having an integral neck.

The neck is normally constructed of the same material as the cup, and extends outwardly from the cup body in a generally perpendicular orientation. The neck has an exterior surface or circumference, and a face intersecting the exterior surface. The neck may also have rib structures extending from the surface, parallel to the face. The face preferably is generally parallel to the surface upon which the cup is mounted.

A slot is provided extending from the face into the neck along the exterior surface. In one embodiment, the slot is generally rectangular. The neck may assume any geometric shape in cross section, but preferably is cylindrical and has a generally cylindrical bore located along its central axis. The slot may additionally have a central detent for locating a similarly shaped head of the hook like a ball in a socket. Preferably the hook will then be in a position so that the seated hook will not touch the rubber cup when the device is attached to a wall.

The hook has a main body from which stabilizing arms and the hook extend. The body is adapted to fit inside the slot in the neck of the cup, and preferably has a head at the end of the body which engages the neck. If the neck has a central bore, this will more readily accept the head of the hook, which should be spherical if a cylindrical bore is present in the neck. Alternatively, the body itself may extend into the neck slot with no discernable head.

The stabilizing arm-like extensions protrude from the hook body outside the neck of the cup, and are adapted to slide over the exterior surface of the neck and support the weight of the object being hung. In order to gain maximum stabilizing advantage, these stabilizing arms should extend around more than fifty percent of an exterior circumference of the neck of the cup.

The hook also has some kind of means upon which an article may be held. I prefer to provide a standard hook having a curvature formed about a central point directly below the hook head. This allows maximum strength and less torque on the head of the hook and the stabilizing arms.

A second embodiment of my invention is similar to the first, using the same cup, with the ribs on the exterior surface of the neck. The difference lies in the hook. In this embodiment, the stabilizing means extend completely around the exterior circumference of the neck, and a closure is attached to the stabilizing means. This closure is sized and positioned to cover the neck face, forming a cap over the neck face, and also has an edge for engaging the ribs along the cup head.

The hook itself on this embodiment is flexible, and extends outwardly from the closure. The far end may have a pin or ball-shaped terminal end to aid in attachment, and either or both of the closure and neck of the cup has a receptacle which is adapted to allow insertion of the terminal end of hook.

These and other advantages and features of the present invention will be more fully understood on reference to the presently preferred embodiments thereof and to the appended drawings.

BRIEF DESCRIPTION OF THE DRAWINGS

FIG. 1 is a front elevational view of a present preferred embodiment of my apparatus for holding articles.

FIG. 2 is a cross sectional view of the embodiment of FIG. 1 taken along the line II—II.

FIG. 3 is a side view of the embodiment of FIG. 1.

FIG. 4 is a cross sectional view similar to FIG. 2 of only the suction cup portion of the embodiment of FIG. 1.

FIG. 5 is a cross sectional view taken along the line V—V of FIG. 4.

FIG. 6 is an isometric view of the hook portion of the embodiment of FIG. 1.

FIG. 7 is a front elevational view of a second preferred embodiment of my apparatus for holding articles.

FIG. 8 is a cross sectional view of the hook portion of the embodiment of FIG. 7.

FIG. 9 is an isometric view of the hook portion FIG. 7.

FIG. 10 is a cross sectional view taken along line VI—VI of FIG. 7.

DESCRIPTION OF THE PREFERRED EMBODIMENTS

Referring to FIGS. 1 through 6, a first present preferred embodiment of the invention is shown with hook means 21 engaging suction cup 2. Hook means 21 is provided with a head 40 that engages a central bore 10 of cup neck 5. The central bore may be of any shape, but is preferably cylindrical to engage a preferably spherical hook head 40. The hook body 45 extends through slot 25, while stabilizing arms 35 surround and engage an exterior circumference of the surface 11 of the neck 5. When a downward force is applied to the hook body 45, stabilizing arms 35 squeeze the neck 5, pressing it into that portion of the hook body 45 adjacent slot 25.

This creates a gripping action that prevents the hook means 21 from sliding off the neck.

As can be seen in FIGS. 2 and 4, the hook body 45 engages suction cup neck 5 at a detent 15. The head 40 is shaped to fit within a compatible bore 10 and detent 15. The head is preferably spherical to fit within a spherical detent 15, and cylindrical bore 10, producing a stable ball and socket engagement. At the same time, the entire surface of that portion of the hook means 21 that is within neck 5 is thus in contact with one of the central bore 10, slot 25, and detent 15. The hook body 45 extends through slot 25, terminating in hook 30. The slot is preferably rectangular to accommodate and support the hook body 45. Slot 25 extends from front face 12 into neck 5. The front face 12 is preferably generally perpendicular to the central line of the central bore 10. The slot extends from the central bore 10 to the outer surface 11 of the neck 5.

As shown in FIG. 3, resilient cup 2 has a conventional cup portion 1 having concave surface 3. When concave surface 3 is pressed against a flat surface, air is forced out of the concave area, and a vacuum is created. The detent 15, as shown in FIG. 2, is located so that the hook 30 will not engage the cup 1 when the entire apparatus is engaged with a flat, usually vertical, surface.

A second preferred embodiment of the invention is shown in FIGS. 7, 8, 9 and 10. The stabilizing means 161 of hook means 121 extends completely around an exterior circumference of the neck 111, and is integral with an attached closure 155, being sized and positioned to cover the neck face 112 of cup 120. Preferably a collar 160 extends along the edge of stabilizing means 161 and engages cup 120 (see FIG. 9). A plurality of ridges may be used along the surface of collar 160 adjacent to neck 111 to facilitate increased weight capabilities of the apparatus. A hollow pin 163 extends from cap 155 into the central bore 100 of the cup head 151 (see FIG. 9). Pin 163, like collar 160 may have a series of ridges along the surface adjacent to hollow portion 165 to facilitate increased weight capabilities of the apparatus. The distal portion 152 of hook 121 is flexible, and has a connector 150 which is sized and shaped to fit into the hollow portion 165 of pin 163. The connector 150 may have a plurality of frets 190 along its length to further stabilize the connector within the hollow portion 165. The hollow portion may also have corresponding interior frets 191 to engage connector frets 190. Alternatively, connector 150 may engage a suitable receptacle, such as a bore 100, in neck 151.

The cup 120 preferably has ribs 70 along the exterior surface 111 of the neck 151. These ribs 70 are adapted to engage collar 160 to hold the hook means 121 in place. Preferably cap 155 will then be flush against neck face 112. Like the previous embodiment, when a downward force is applied to the hook 121, collar 160 squeezes the neck 151, pressing it into the interior portion of cap 155 adjacent collar 160 and pin 163. This creates a gripping action that prevents the hook 121 from sliding off the neck.

While I have described two present preferred embodiments of the invention, it is to be distinctly understood that the invention is not limited thereto but may be otherwise embodied and practiced within the scope of the following claims.

I claim:

1. An apparatus for holding articles comprising:
   (a) a suction cup of the type having:
      (i) a concave bearing surface,
      (ii) an opposite face, and
      (iii) a neck attached to the opposite face, the neck having an exterior surface, a face intersecting the exterior surface and a slot extending from the face into the neck parallel with the exterior surface;
   (b) an integral removable hook means, slidably engaging the suction cup, having
      (i) a head slidably engaging the slot in the neck of the cup,
      (ii) a hook body extending from the head upon which an article may be held,
      (iii) stabilizing means extending from the hook body and slidably engaging the exterior surface of the neck.

2. An apparatus for holding articles as claimed in claim 1, wherein the slot has a central detent for receiving the head of the hook means thereby holding the hook in a position determined by the location of the detent.

3. An apparatus for holding articles as claimed in claim 2, wherein the seated hook will not touch the suction cup when the device is attached to a wall.

4. An apparatus for holding articles as claimed in claim 1 wherein the neck is cylindrical having a central axis therethrough, and the slot therein comprises a generally cylindrical bore extending from the face into the neck along the central axis.

5. An apparatus for holding articles as claimed in claim 4 wherein the head of the hook means is sized and shaped to engage the cylindrical bore in the neck.

6. An apparatus for holding articles as claimed in claim 4, wherein the slot extends from the central axis to the exterior surface.

7. An apparatus for holding articles as claimed in claim 1 wherein the slot is generally rectangular and extends from a central bore completely through the exterior surface.

8. An apparatus for holding articles as claimed in claim 1 wherein the hook has a curvature about a central point, and is positioned s the central point is directly below the head.

9. An apparatus for holding articles as claimed in claim 1 wherein the neck is cylindrical and the stabilizing means are generally curved to engage the neck, and the stabilizing means extend around more than fifty percent of an exterior circumference of the neck.

10. Apparatus for holding articles as claimed in claim 1, also comprising a plurality of ribs attached to the neck along its exterior surface substantially parallel to the face.

11. An apparatus for holding articles as claimed in claim 10, wherein the stabilizing means extend completely around an exterior circumference of the neck.

12. An apparatus for holding articles as claimed in claim 10 further comprising a closure attached to the stabilizing means being sized and positioned to cover the neck face, and having means for engaging the ribs along the cup head.

13. An apparatus for holding articles as claimed in claim 12, wherein the hook body is flexible, has a distal termination, and the closure has a receptacle which is adapted to allow engagement of the termination of the hook body.

* * * * *